United States Patent [19]
Uffman

[11] 3,970,407
[45] July 20, 1976

[54] ROTARY CUTTER

[76] Inventor: Leroy E. Uffman, 5524 Elmer Ave., North Hollywood, Calif. 91601

[22] Filed: Nov. 25, 1974

[21] Appl. No.: 526,632

[52] U.S. Cl. .............................. 408/204; 7/1 Q; 81/125; 145/50 DA; 279/1 M; 403/DIG. 1; 408/239 A
[51] Int. Cl.² .............................. B23B 31/28
[58] Field of Search ............... 279/1 M; 7/1 Q; 403/DIG. 1; 408/239, 204; 83/686, 698; 145/50 DA; 81/125

[56] References Cited
UNITED STATES PATENTS

| | | | |
|---|---|---|---|
| 2,260,055 | 10/1941 | Reardon | 7/1 Q |
| 2,678,228 | 5/1954 | Gerhardt | 403/DIG. 1 X |
| 2,782,854 | 2/1957 | Muhlbach | 408/204 X |
| R24,066 | 10/1955 | Brown | 279/1 M |

Primary Examiner—Othell M. Simpson
Assistant Examiner—Z. R. Bilinsky
Attorney, Agent, or Firm—Roger A. Marrs

[57] ABSTRACT

A rotary cutter is disclosed herein having a hollow body adapted to be mounted on to the chuck of a power driven device such as a hand drill or the like. Within the hollow of the body, there is a metallic and magnetic member formed with a central slot or groove. A circular cutter is insertably received within the hollow of the body and includes projections which make and engage with the slot of the magnetic. The circular cutter is maintained in position on the body by the force of magnetic attraction and the rotating power of the body is imparted to the circular cutter by engagement of the projection in the slotted magnet. A circular cutter includes a tapered cutting edge which is disposed outwardly from the body so that only the circular cutting edge will engage with a work piece.

1 Claim, 4 Drawing Figures

ROTARY CUTTER

BACKGROUND OF THE INVENTION

1. Field of the Invention

This invention relates to rotary cutters and more particularly to a novel rotary cutter held in place to a power driven mechanism by magnetic force and which includes a slotted arrangement for imparting force of the drill through the cutter.

2. Brief Description of the Prior Art

In the past, it has been conventional practice to form circular blanks such as washers, discs or the like from relatively thin material such as sheets of cork, rubber, paper or the like. Generally, the sheet of material is struck with a circular cutter by means of a hammer blow striking the backside of the circular cutter while the edge of the cutter engages and cuts through the material. However, such a device is suitable for cutting washers or discs for a relatively small run of parts; however, for large productions, such a mechanism is too slow and machines employing a plurality of circular cutters are used. Such machines are extremely expensive and are not available to the small work shop and it is uneconomical to employ such machines for short run schedules. Furthermore, whether the impact hammer method is used for cutting the material or automatic machines which punch the material are employed, such methods are not practical where extremely thin material, such as paper, constitute the work material. In such instances, washers or discs may be cut only when a plurality of sheets are cut at one time so that perhaps 100 to 200 washers are cut at a time. Again, such a procedure is for mass production and high speed run scheduling.

Therefore, a long standing need exists to provide a simple and economical rotary cutter adapted to be used with ordinary power equipment such as power drills or the like wherein washers or other circular blanks may be cut from thick or relatively thin sheets of material.

SUMMARY OF THE INVENTION

Accordingly, the above problems and difficulties are obviated by the present invention which provides a novel rotary cutter including an elongated body portion having a hollow cavity in which a piece of magnetic material is secured. The magnetic material includes an elongated slot adapted to receive projections extending from the rear side of a circular cutter. The circular cutter is insertably received within the hollow of the body and is of sufficient length so that the circular cutting edge projects from the body into contact with the material to be cut. Preferably, the circular cutting edge is formed from a taper which outwardly diverges from the cutting edge rearwardly.

Therefore, it is among the primary objects of the present invention to provide a novel rotary cutting device that may be readily adapted to be operated from conventional and low cost power driven material.

Another object of the present invention is to provide a novel rotary cutter having a body portion adapted to insertably receive one of a variety of circular cutters having different diameters.

Still another object of the present invention is to provide a novel rotary cutter having a body portion functioning as an attachment to a conventional chuck of a drill and which incorporates the principles of magnetic attraction for holding a circular cutter in place.

Still another object of the present invention is to provide a novel circular cutter having projections adapted to receive the slots of a magnetic so that the cutter is held in proper position during rotation by power equipment and whereby the slot and projections provide a means for imparting a rotary movement of the power means to the rotary cutter.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

DESCRIPTION OF THE PREFERRED EMBODIMENT

Figure 1:
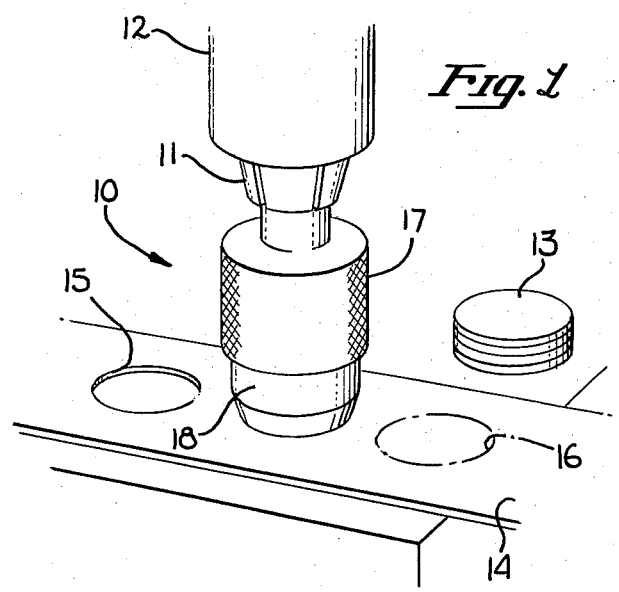
FIG. 1 is a perspective view of the novel rotary cutter of the present invention illustrated in a typical application.

Referring to FIG. 1, the novel rotary cutter is shown in the direction of arrow 10 and is illustrated as being attached to a chuck 11 carried on the end of a rotary power means 12. The rotary cutter 10 is illustrated in a typical application for cutting a plurality of discs 13 from a strip of sheet material 14. As illustrated, disc 13 has been cut from sheet 14 so as to leave a hole or aperture 15 therein and the next disc is to be cut from the sheet 14 as indicated in broken lines by the numeral 16. The sheet material is relatively thin and may be composed of paper composition, rubber, plastic, cork or the like. In general, the rotary cutter includes a knurled body portion 17 to which a circular cutter 18 is insertably carried at one end thereof. Attachment of the body to the drill chuck 11 is at one end while the opposite end of the body carries the circular cutter 18.

Figure 2:
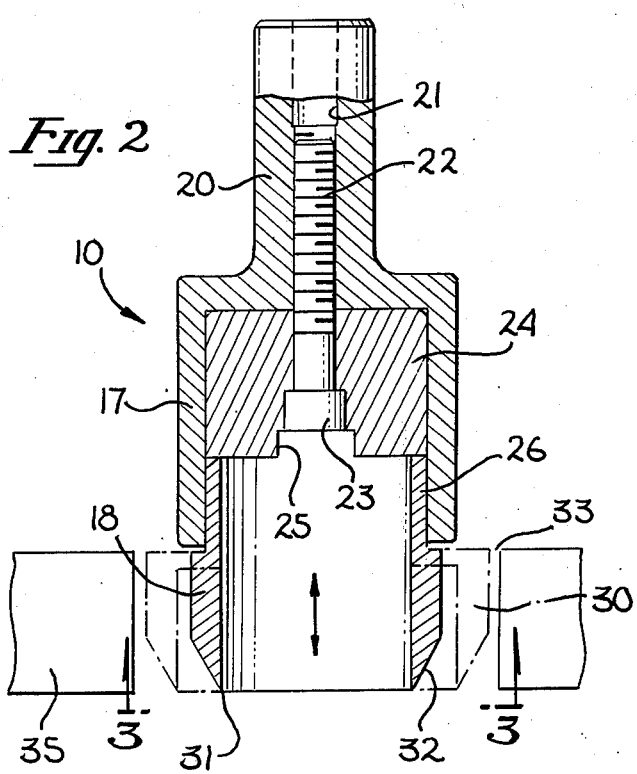
FIG. 2 is a transverse cross sectional view of a rotary cutter of the present invention.

Referring now in general to FIG. 2, it can be seen that body 17 of the rotary cutter 10 includes an extension 20 which is provided with a bore 21 that is suitably threaded to receive the threaded end of a bolt 22. Bolt 22 includes a slotted head 23 for retaining a magnetic slug 24 within the hollow of the body 17. The magnetic slug or material 24 is seated in the bottom of the hollow and includes an elongated slot 25 which opens into the hollow of the body.

The circular cutter 18 includes a collar of reduced diameter as indicated by numeral 26 that fits within the hollow defined by the circular wall of body 17 and bears against the exposed surface of the magnetic slug 24. Since the circular cutter 18 is composed of a ferrous material, magnetic attraction will hold the rotary cutter within the hollow of the body 17. It is to be particularly noted that the circular cutter 18 includes a pair of projections 27 and 28, shown more clearly in FIG. 4, that are insertably received within the slot 25. Therefore, it can be seen that the magnetic attraction of the magnetic slug 24 retains the rotary cutter within the hollow of the body while the projections 27 and 28 receive imparted energy from the drill motor so that the circular cutter will rotate accordingly.

The circular cutter further includes a portion 30 which outwardly extends from the body portion and terminates in a circular cutting edge indicated by numeral 31. The cutting edge is preferably formed by a diverging paper so as to produce a rearwardly sloping wall 32. If desired, the circular cutter 18 may be removed by manually pulling the cutter from the body to overcome the magnetic attraction and another circular cutter of different diameter may be inserted for use. As shown in broken lines, a circular cutter of a wider diameter is illustrated by numeral 33. Therefore, it can be seen that by using cutters of different diameters, washers may be produced in a two cut operation. The circular cutter of reduced diameter represents the inner diameter to be cut out from the material representing the hole in the washer while the cutter of greater diameter represents the outer diameter of the washer.

Figure 3:
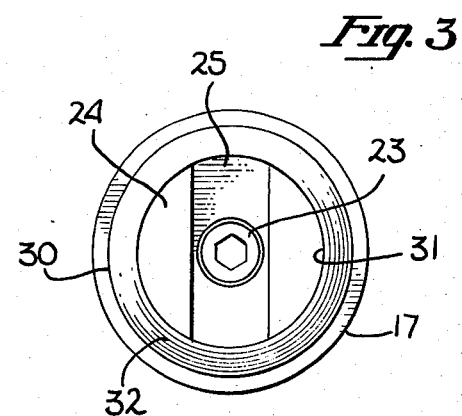
FIG. 3 is an end view taken in the direction of arrows 3—3 of FIG. 2.

Referring now to FIG. 3 in detail, it can be seen that the slot 25 in magnetic material 24 extends across the full length of the magnetic material so that the projections 27 and 28 need not be precisely registered with the slot in order to fit. Also, it is noted that the head 23 of bolt 22 includes a hexagon slot or aperture so that the bolt may be loosened or tightened with an Allen wrench.

Figure 4:
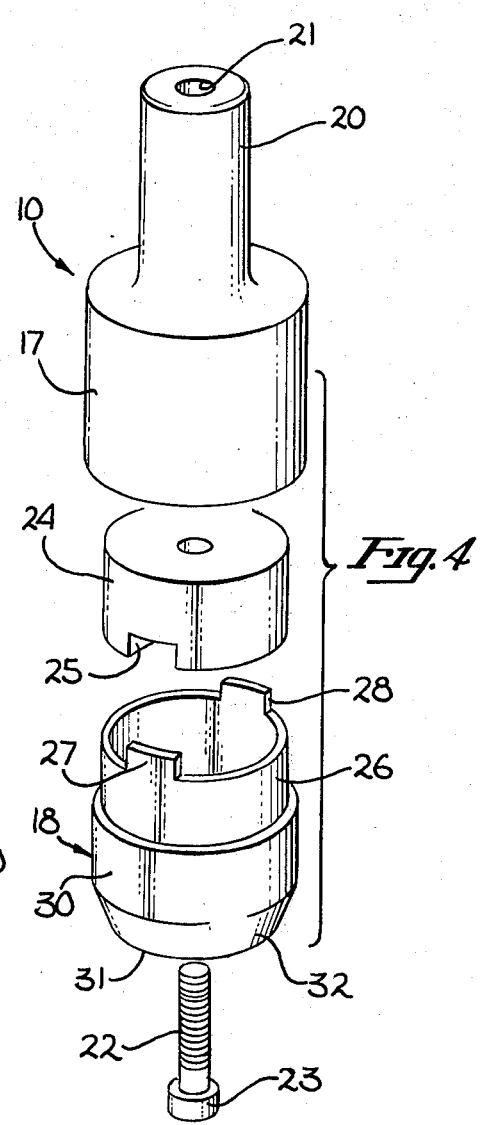
FIG. 4 is an exploded perspective view of the novel rotary cutter incorporating the present invention.

In FIG. 4, an exploded view of the component parts forming the present invention are illustrated. It is understood that the body 17 includes magnetic material 24 and bolt 22 as a unit and that the circular cutter 18 is merely insertably received within the hollow of body 17 so that the projections 27 and 28 are disposed within the slot 25. The magnetic attraction will hold the cutter in place while handling and while in use.

It is to be noted that when multiple cutters, of different diameters for example, are inserted into the hollow of the body, the inner cutter representing the ID cut of a washer incorporates an inwardly and upwardly sloping cutting surface. In other words, surface 32 is reversed and slopes upwardly from the outside cutting edge towards the central axis of the cutter. Also, a feature may reside in machining the hollow in the body and the OD of the cutter reduced portion 26 so that a frictional or interference fit is produced for releasably securing the cutter to the body, in the absence of a magnetic force or in the event the force is weak.

In actual practice, a suitable weight 35 is placed on the material 14 during the cutting procedure so that this material will not rotate with the cutter. The weight on the material would resist any tendency of the cutter to impart a turning or twisting component force into the material.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A rotary cutter for operating by a power rotating means comprising the combination of:

a body having a hollow interior opening at one end thereof;

a magnetic material secured to said body within said hollow and occupying a portion of said hollow;

said magnetic material provided with a slot opening into the remaining portion of said hollow;

a circular cutter insertably received into said remaining hollow portion releasably engageable with said magnetic material for removably securing said cutter to said body;

means cooperatively disposed between said magnetic material and said cutter for imparting rotary movement from said body to said cutter;

said rotary imparting means includes a pair of projections carried on said cutter engaged with said slot;

said body includes an extension adapted to be coupled to the chuck of said power means;

said cutter comprises a collar of reduced diameter insertable within said hollow and a portion of larger diameter extending away from said body;

said cutter includes a circular cutting edge defined by a circular rearwardly and outwardly diverging sloping surface; and a threaded bolt securing said magnetic material to said body.

* * * * *